UNITED STATES PATENT OFFICE.

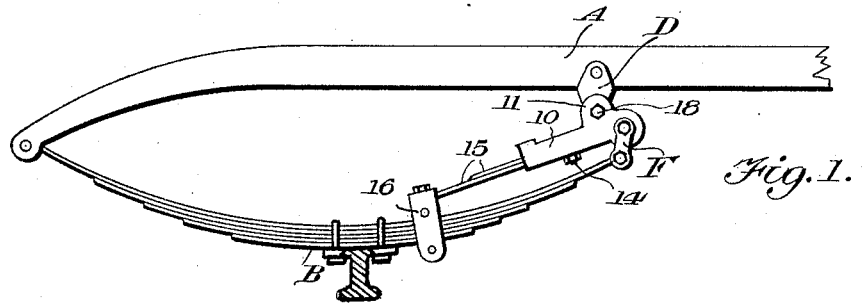
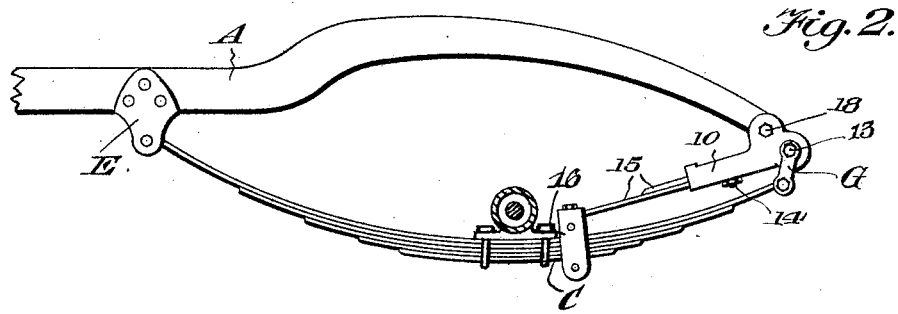
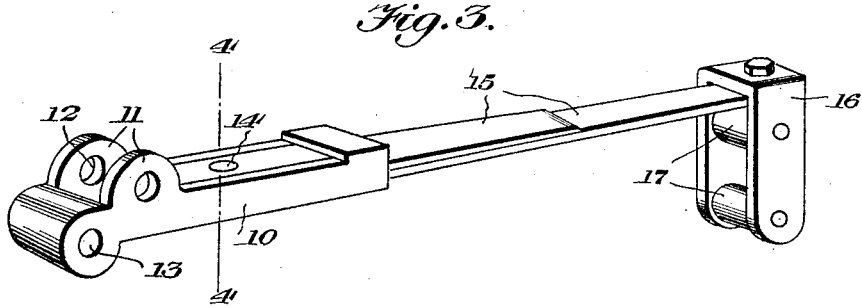
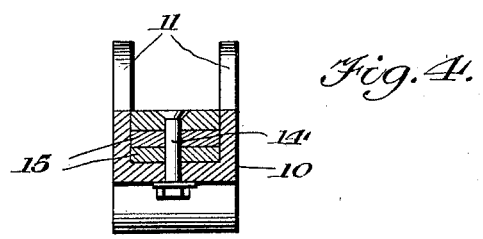

HENRY FAUDREE AND HARRY E. COOPER, OF COLUMBUS, INDIANA.

SHOCK-ABSORBER.

1,401,059.  Specification of Letters Patent.  Patented Dec. 20, 1921.

Application filed March 15, 1921. Serial No. 452,461.

*To all whom it may concern:*

Be it known that we, HENRY FAUDREE and HARRY E. COOPER, citizens of the United States, residing at Columbus, in the county of Bartholomew and State of Indiana, have invented new and useful Improvements in Shock-Absorbers, of which the following is a specification.

This invention relates to shock absorbers for automobiles and has for its object the provision of an auxiliary spring device adapted to be used in connection with any automobile provided with semi elliptic springs, our device taking the place of one of the ordinary spring hangers.

An important and more specific object is the provision of a shock absorber of this character which includes a plurality of spring leaves connected at one end with a lever device which constitutes a hanger and connected at the other end with a roller carrying frame, engaging the ordinary springs.

An additional object is the provision of a device of this character which will be simple and inexpensive in manufacture, easy to install, highly efficient in use, durable in service and a general improvement in the art.

With the above and other objects and advantages in view, the invention consists in the details of construction to be hereinafter more fully described and claimed, and illustrated in the accompanying drawings, in which:—

Figure 1 is a side elevation of our device applied to the front spring of an automobile.

Fig. 2 is a similar view showing the device applied to the rear springs.

Fig. 3 is a perspective view of our device detached and

Fig. 4 is a cross sectional view on the line 4—4 of Fig. 3.

Referring more particularly to the drawings the letter A designates the frame bars of the chassis of an automobile, B designates the front spring and C designates the rear spring, the springs being of the semi-elliptic type. The letter D designates the bracket from which the rear end of the front spring is ordinarily suspended and the letter E designates the bracket from which the forward end of the rear spring is ordinarily suspended. The letters F and G designate the ordinary hangers associated with the front and rear springs respectively, and which are ordinarily used for connecting the springs with the frame bars.

In carrying out our invention we make use of an auxiliary spring device which comprises an angular shaped body 10 formed at its side edges intermediate its ends with spaced gears 11 provided with holes 12. At one end the body is formed with a transverse hole 13 adapted for engagement with the hangers F and G as the case may be. Secured upon the other end of the body as by means of a suitable bolt 14 is a plurality of leaf springs 15, the longer of which is secured within the bite portion of an inverted U-shaped yoke 16 within which are journaled spaced rollers 17.

In the application of our device to the front spring the inverted U-shaped yoke is engaged upon the front spring B with the rollers 17 engaging against the top and bottom of the said spring. The ears 11 will straddle the bracket D and a suitable bolt 18 is passed through the bracket and through the hole 12 in the ears. The hanger F is then engaged through the hole 13 and the connection is complete. Our device is applied to the rear springs in the same manner except that the ears 11 engage against the sides of the rear extremity of the frame bar A instead of being engaged with the hanger bracket.

In the operation of the device it will be seen that the auxiliary spring leaves 15 of our device will operate very efficiently to absorb certain shocks and jars incidental to travel over rough roads and the like so that much more comfortable riding of the vehicle will be assured. Owing to the fact that our device is pivoted upon the bolts 18 and owing to the provision of the rollers 17 in the guide yoke it will be readily apparent that there will be no binding which would interfere with the freedom of movement and it will likewise be apparent that this particular construction and peculiar connection will serve to protect the springs against damage in case of striking an unusually severe jolt.

While we have shown and described the preferred embodiment of the invention it is of course to be readily understood that we reserve the right to make such changes in the form, construction and arrangement of parts as will not depart from the spirit of the invention or the scope of the subjoined claim.

Having thus described our invention, we claim:—

In combination with the semi-elliptic spring of an automobile, one end of the spring being connected with the frame bar, a shock absorber comprising a body channel shaped in cross section provided intermediate its ends with spaced ears pivotally engaged upon opposite sides of a frame bar, tensioning leaf springs secured to one end portion of said body within the channel thereof, an inverted U-shaped yoke secured to the free end of the longer of the tensioning leaf springs, spaced rollers journaled within said yoke and engaging against the top and bottom of the elliptic spring, the other end of the body being slightly offset whereby to be in non-alinement with said leaf springs, said offset end being formed with a transverse hole, and a shackle connected with the free end of the semi-elliptic spring and having a securing bolt engaging through said hole.

In testimony whereof we affix our signatures.

HENRY FAUDREE.
HARRY E. COOPER.